United States Patent
Rowley

(10) Patent No.: US 8,934,620 B2
(45) Date of Patent: Jan. 13, 2015

(54) ACOUSTIC ECHO CANCELLATION FOR HIGH NOISE AND EXCESSIVE DOUBLE TALK

(75) Inventor: David Lee Rowley, Indianapolis, IN (US)

(73) Assignee: Cogent Signals, Inc., Indianapolis, IN (US)

( * ) Notice: Subject to any disclaimer, the term of this patent is extended or adjusted under 35 U.S.C. 154(b) by 502 days.

(21) Appl. No.: 13/436,016

(22) Filed: Mar. 30, 2012

(65) Prior Publication Data

US 2012/0250852 A1  Oct. 4, 2012

Related U.S. Application Data

(60) Provisional application No. 61/470,534, filed on Apr. 1, 2011.

(51) Int. Cl.
*H04M 9/08* (2006.01)

(52) U.S. Cl.
CPC ................................ *H04M 9/082* (2013.01)
USPC ............ 379/406.01; 379/406.05; 379/406.08; 455/570; 370/286; 381/71.11

(58) Field of Classification Search
USPC ............. 379/406.01–406.11, 406.14; 381/66, 381/71.1–71.8, 71.11, 71.14, 99; 455/202, 455/203, 210–213, 296, 306–308, 570; 370/286–291, 497; 704/E21.002
See application file for complete search history.

(56) References Cited

U.S. PATENT DOCUMENTS

| | | | |
|---|---|---|---|
| 5,548,642 A | 8/1996 | Diethorn | |
| 5,664,011 A | 9/1997 | Crochiere et al. | |
| 6,526,141 B2 | 2/2003 | Benesty et al. | |
| 6,608,897 B1 | 8/2003 | Jin et al. | |
| 6,792,106 B1 | 9/2004 | Liu | |
| 6,947,549 B2 | 9/2005 | Yiu et al. | |
| 7,760,673 B2 | 7/2010 | LeBlanc | |
| 8,150,027 B2 * | 4/2012 | Guerin et al. | 379/406.03 |
| 8,300,802 B2 * | 10/2012 | Deng et al. | 379/406.08 |
| 8,831,210 B2 * | 9/2014 | Kumar | 379/406.08 |
| 2013/0129101 A1 * | 5/2013 | Tashev et al. | 381/66 |

OTHER PUBLICATIONS

Haykin, Simon, "Filter Theory," 3d Edition, 1995, pp. 433-439.
Kazuo Ochiai et al, "Echo Canceler with Two Echo Path Models," IEEE Transactions on Communications, vol., Com-25, No. 6, Jun. 1977.
Waterschoot, Toon Van and Moonen, Marc, "Double-Talk Robust Acoustic Echo Cancellation With Continuous Near-End Activity," 2005, Proceedings of Eusipco, 2005, Belgium.
Birkett, A.N. and Goubran, R.A., "Acoustic Echo Cancellation Using NLMS-Neural Network Structures," Department of Systems and Computer Engineering, 1995, Canada.

\* cited by examiner

*Primary Examiner* — MD S Elahee
(74) *Attorney, Agent, or Firm* — Maginot, Moore & Beck, LLP

(57) ABSTRACT

Methods and devices for improved echo cancellation in high noise environments, such as in-car speakerphones and the like, are provided that improve cancellation convergence in a high noise environment and in the presence of double talk. A new update method enables a robust echo canceller to update with reduced concern for the canceller being in a receive state or a double talk state. If a signal generated by a local talker is substantially the same as high noise, in terms of corruption of the echo canceller, the echo canceller converges in a robust manner even with continuous high noise at the input.

21 Claims, 6 Drawing Sheets

ACOUSTIC ECHO CANCELLATION FOR HIGH NOISE AND EXCESSIVE DOUBLE TALK

CLAIM OF PRIORITY

This application claims priority to U.S. Provisional Application No. 61/470,534, which is entitled "Acoustic Echo Cancellation for High Noise and Excessive Double Talk," and was filed on Apr. 1, 2011, the contents of which are incorporated herein by reference in their entirety.

TECHNICAL FIELD

This document relates generally to devices and systems for communication, and, more particularly, to echo cancellation in voice communication.

BACKGROUND

Echoes arise at various points in a voice communication system. Without proper control they can cause significant degradation in conversation quality. In telecommunications systems, echoes can be caused by an impedance mismatch between two-wire local customer loops coupled to four-wire long distance trunks. If the impedance between the two systems is matched a communication signal passes between them without causing an echo. For various reasons it is difficult to match the impedances exactly. When there is a mismatch part of the signal is reflected back to the far-end talker as an echo. The situation can be further complicated by the presence of two-wire toll switches, allowing intermediate four-two-four wire conversions internal to the network. In telephone connections using satellite links with round-trip delays on the order of 600 ms, line echoes can become particularly disruptive.

In a hands-free communication system, such as videoconferences, mobile telephones and computer multimedia applications, echoes are caused by the microphone picking up sound from the loudspeaker and feeding it back to the far-end talker as an echo. Often the loudspeakers and microphones are placed at a distance from the participants making the echo sound loud and clear. Furthermore, the sound reverberation time in a typical office sized room is several hundreds of milliseconds, and even less in a vehicle. This corresponds to several hundred samples at a sampling rate of 8 kHz, which creates high complexity in the implementation of an acoustic echo canceller.

In a typical hands-free environment, a near-end space contains a loudspeaker and a microphone. A far-end talker produces a speech signal which is broadcast over the loudspeaker, with an echo path created by sound from the loudspeaker received by the microphone. The echo path can be represented by an unknown transfer function that varies with changes in the space such as movement of objects within the space like the loudspeaker, microphone or people and even changes in ambient temperature. An echo is transmitted back to the far-end as a return signal $y(n)$. Furthermore, an additional component $v(n)$ may comprise background noise or double-talk (such as a person in the space who is also talking) will also be detected by the microphone and form part of the return signal $y(n)$.

Echo cancellers have been developed to suppress these echoes in communication systems. A typical echo canceller includes an adaptive filter and a subtractor. The incoming signal is passed to the adaptive filter which attempts to model the echo path and estimate the echo. The estimate is subtracted from the return signal to produce an error signal. The error signal is then fed back to the adaptive filter, which adjusts its filter coefficients in order to minimize the error signal. The filter coefficients converge toward values that optimize the estimate signal in order to cancel the echo signal. Echo cancellers are deployed in every telephone network, and are essential for any hands-free speech devices.

In order for the adaptive filter to correctly model the echo path, the return signal $y(n)$ of the echo path must originate solely from its input signal. During double-talking, speech at the near-end that acts as uncorrelated noise can cause the filter coefficients to diverge. Coefficient drift is usually not catastrophic although a brief echo may be heard until convergence is established again. In closed-loop paths (which typically include acoustic echo paths) coefficient drift may lead to an unstable system which causes howling and makes convergence difficult. To alleviate this problem double-talk detectors are commonly used for disabling the adaptation during the occurrence of double-talk. Unfortunately, double-talk detectors fail to indicate the presence of double-talk for a whole syllable after double-talk begins. During this time the coefficients may drift and lead to howling as mentioned above. Furthermore, double-talk becomes increasingly difficult to detect as an acoustic echo becomes large in comparison to the near-end signal.

One adaptive echo canceller arranged for overcoming the double-talking problem is proposed by Ochiai et al. in "Echo canceller with two echo path models", IEEE Transactions on Communications, 25(6): 589-595, 1977. This document describes an echo canceller with a fixed (non-adaptive) foreground filter and an adaptive background filter. Each of the filters generates an estimate of the echo signal, the filter coefficients of the foreground filter are replaced with those of the background filter when the background filter provides a better estimate of the echo signal than the foreground filter. During uncorrelated double-talking, the foreground filter is relatively immune from coefficient drift in the background filter. There are, however, drawbacks to this approach. In the event the filter coefficients of the background filter diverge and are subsequently re-converged, there may be a relatively long delay before the background filter works back to providing a better error signal than the foreground filter. As a result, the convergence time for the foreground filter may be significantly delayed. This is particularly serious when double-talk is followed immediately by echo path variations because the echo canceller fails to track any variation until the background filter is re-converged. This causes a significant degradation of speech conversation.

For an echo canceller with two filters, the foreground filter is non-adaptive while the secondary filter uses a least-squares-type technique such as least squares, least mean squares, or normalized least mean squares (NLMS). Double-talk causes divergence in filters adapted with these kinds of techniques which results in a time delay before the filter coefficients return to track echo path variations again. Since echo paths continually change echoes can become apparent during this delay.

To improve on this prior approach, U.S. Pat. No. 6,947,549 discloses an echo canceller having two parallel filters and a controller. The controller chooses the best of the two filters for the final echo cancellation. The filter coefficients are exchanged between the two filters constantly so that both filters retain performance all the time even if double-talk and echo path variations occur very closely in time. One filter is strongly robust and will not diverge during double-talk, while the other filter is weakly robust and will converge rapidly during echo path variation. In the instance when the slower canceller is perfectly converged and near in noise is introduced at the microphone, the perfectly converged canceller would diverge, which frustrates the goal of the echo canceller in a high noise environment.

Other approaches to echo cancellation or noise reduction are disclosed in U.S. Pat. Nos. 6,792,106; 6,608,897; 6,526,141; and 5,664,011.

SUMMARY

In one embodiment, an echo cancellation system has been developed that includes an input device configured to receive a first acoustic signal from a first telephonic device and a second acoustic signal from a second telephonic device, an output device configured to generate an output acoustic signal, and a signal processor operatively connected to the input device and the output device. The signal processor is configured to: apply a first echo cancellation filter to the first acoustic signal to generate an estimated model of an echo generated by the first acoustic signal in the second telephonic device; identify a difference between the estimated model and the second acoustic signal; identify a maximum value corresponding to a maximum of (1) the identified difference between the estimated model and the second acoustic signal and (2) a predetermined minimum value; generate a plurality of values corresponding to the first acoustic signal over a series of time intervals; update a parameter in a second echo cancellation filter with reference to a product of the identified difference and a complex conjugate of the plurality of values divided by a product of the maximum value and a magnitude of the plurality of identified values; apply the updated parameter in the second echo cancellation filter to the first echo cancellation filter; apply the first echo cancellation filter with the updated parameter to the second acoustic signal to generate a second filtered acoustic signal that reduces or eliminates an echo corresponding to the first acoustic signal; and output the second filtered acoustic signal through the output device.

In another embodiment, a method for echo cancellation has been developed that includes applying a first echo cancellation filter to a first acoustic signal received from a first telephonic device through an input device to generate an estimated model of an echo generated by the first acoustic signal in the second telephonic device, identifying a difference between the estimated model and the second acoustic signal with the signal processor, identifying a maximum value corresponding to a maximum of (1) the identified difference between the estimated model and the second acoustic signal and (2) a predetermined minimum value with the signal processor, generating a plurality of values corresponding to the first acoustic signal over a series of time intervals with the signal processor, updating a parameter in a second echo cancellation filter with the signal processor with reference to a product of the identified difference and a complex conjugate of the plurality of values divided by a product of the maximum value and a magnitude of the plurality of identified values, applying the updated parameter in the second echo cancellation filter to the first echo cancellation filter with the signal processor, and applying the first echo cancellation filter with the updated parameter to the second acoustic signal to generate a second filtered acoustic signal with the signal processor, which reduces or eliminates an echo corresponding to the first acoustic signal, and outputting the second filtered acoustic signal with an output device.

In another embodiment, a further echo cancellation system has been developed that includes an input device configured to receive a first acoustic signal from a first telephonic device and a second acoustic signal from a second telephonic device, an output device configured to generate an output acoustic signal, and a signal processor operatively connected to the input device and the output device. The signal processor is configured to: apply a first echo cancellation filter to the first acoustic signal to generate an estimated model of an echo generated by the first acoustic signal in the second telephonic device; identify a difference between the estimated model and the second acoustic signal; identify a maximum value corresponding to a maximum of (1) the identified difference between the estimated model and the second acoustic signal and (2) a predetermined minimum value; generate a plurality of real values corresponding to the first acoustic signal over a series of time intervals; update a parameter in a second echo cancellation filter with reference to a product of the identified difference and a the plurality of real values divided by a product of the maximum value and a magnitude of the plurality of real values; apply the updated parameter in the second echo cancellation filter to the first echo cancellation filter; apply the first echo cancellation filter with the updated parameter to the second acoustic signal to generate a second filtered acoustic signal that reduces or eliminates an echo corresponding to the first acoustic signal; and output the second filtered acoustic signal through the output device.

DETAILED DESCRIPTION

Figure 1:
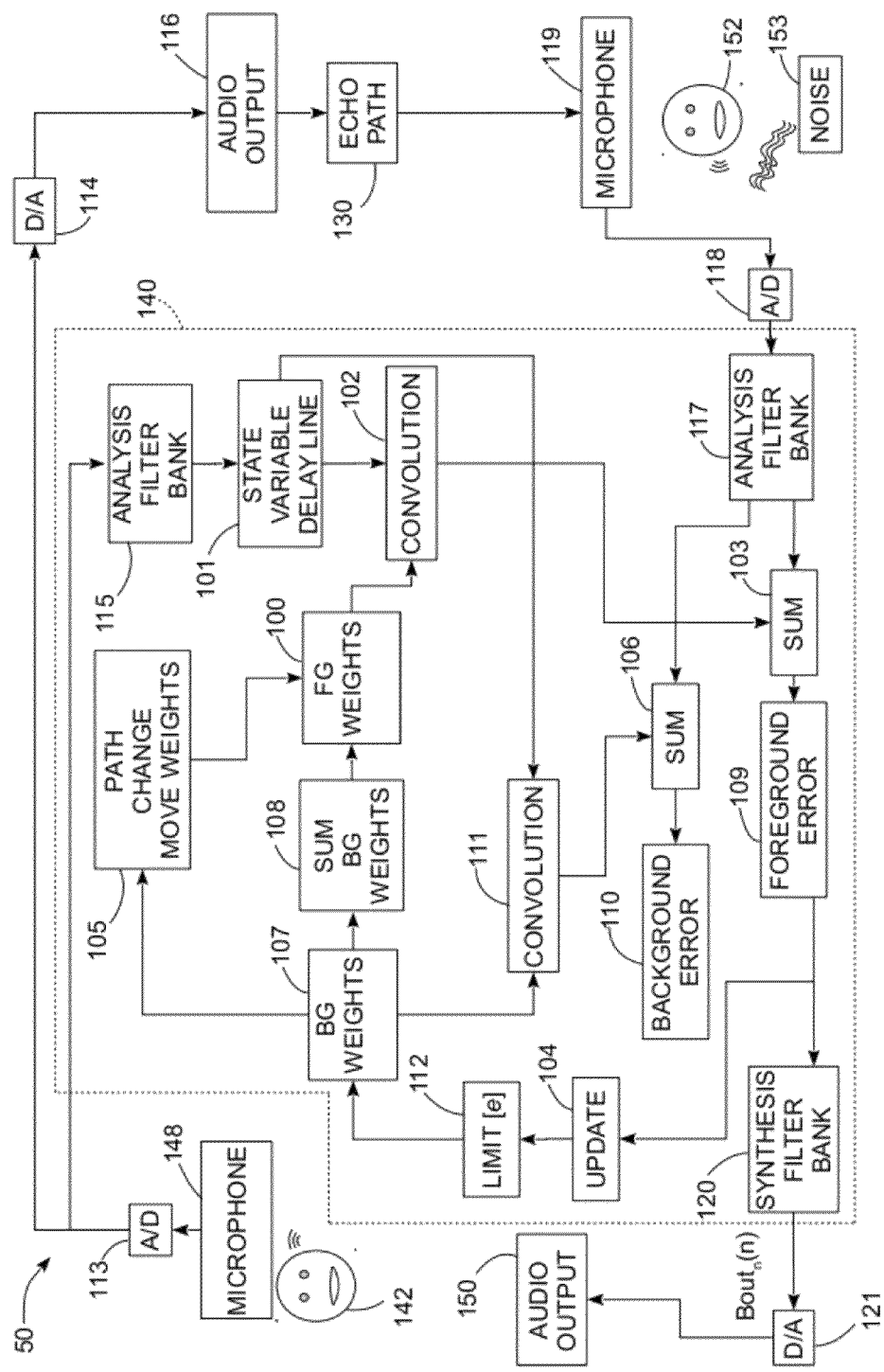
FIG. 1 is a schematic diagram of an echo cancellation system.

For a general understanding of the environment for the system and method disclosed herein as well as the details for the system and method, reference is made to the drawings. In the drawings, like reference numerals have been used throughout to designate like elements.

FIG. 1 depicts an echo cancellation system 50 that reduces or eliminates echo between two parties in a voice conversation. In FIG. 1, one party, referred to as a remote party 142 speaks into an audio input device such as microphone 148 in a telephonic device. As described in more detail below, a telephonic device includes a wide range of telecommunication devices that transmit voice and sound communications. The microphone 148 generates an analog acoustic signal, and an analog to digital converter (A/D) 113 converts the analog signal to a digital signal. As used herein, the term "acoustic signal" refers to any signal that corresponds to spoken words or sounds. In particular, an acoustic signal can be an analog or digital electromagnetic signal. The acoustic signal from the remote party 142 is transmitted to a digital to audio (D/A) converter 114 in a second telephonic device of a local party 152. An audio output 116, such as a loudspeaker, converts the analog acoustic signal into sound waves that the local party 152 hears during communication with the remote party 142. For illustrative purposes, the acoustic signal from the microphone 148, including sounds from the remote party 142 and any other sounds detected by the microphone 148, is referred to as the first acoustic signal.

During the communication process, at least some of the sounds that are emitted from the audio output 116 are detected by a microphone 119 used by the local party 152. The sounds from the audio output 116 transfer to the microphone 119 through the echo path 130. The echo path 130 can be represented physically as the physical space between the audio output 116 and the microphone 119, and the environment around the audio output 116 and microphone 119 including and materials that conduct the sound either directly or through reverberations. The echo cancellation system 50 generates estimates of the echo signal that reaches the microphone 119 through the echo path 130, and updates the estimates to account for changes in the audio signal from the audio output 116 and changes in the echo path 130. The local party 152 also speaks into the microphone 119, and one or more noise sources 153 can also generate sounds that are recorded by the microphone 119. A second A/D device 118 converts the analog acoustic signal from the microphone 119 into a digital acoustic signal. For illustrative purposes, the acoustic signal recorded by the microphone 119, including sounds from the local party 152, potential echo from first acoustic signal through the audio output 116, and noise from the noise sources 153, is referred to as the second acoustic signal. Thus, the microphone 119 and D/A 118 generate an acoustic signal that represents both the speech of the local party 152, and an echo from the remote party 142. Further, because of the potential for double-talk between the remote party 142 and local party 152, and because the microphone 119 detects noise from the noise source 153 while the remote party 142 is speaking, the acoustic signal generated by the microphone 119 often includes both an echo signal component and a non-echoed input signal component.

In FIG. 1, an echo cancellation system 50 processes the acoustic signals generated by the microphone 119 to reduce or eliminate echo in the acoustic signal that returns to the remote party 142 through a D/A converter 121 and audio output device 150. That is to say, the output device 150 receives an acoustic signal where some or all of the echo from the original acoustic signal generated by the remote party 142 is removed from the acoustic signal generated by the microphone 119. Additionally, the acoustic signal also includes substantially all of the sounds produced by the local party 152 and the noise 153. In one common example, the noise source 153 represents noise generated in an automobile occupied by the local party 152 during a conversation using a cellular telephone, although the noise source 153 can be any source of noise that is detected by the microphone 119. Additional filters can be used to reduce or eliminate the noise 153 that is reproduced by the audio output 150, while the echo cancellation system 50 cancels the echo from the remote party.

FIG. 1 depicts the echo cancellation system 50 schematically as functional blocks. A signal processor 140 implements the functions of the echo cancellation system 50. In one embodiment, the signal processor 140 is a digital signal processor (DSP). In another embodiment, the signal processor is a general purpose central processing unit (CPU), microcontroller, field programmable gate array (FPGA), or other digital processing device that is configured to perform echo cancellation with a digital representation of the acoustic signal from the remote party 142 and a digital representation of the acoustic signal from the local party 152.

In the echo cancellation system 50, the signal processor 140 is operatively connected to at least one input device and at least one output device. In one embodiment, the input devices are an analog audio input with an analog to digital (A/D) converter such as microphone 119 and A/D converter 118 for the local party 152 and microphone 148 and A/D converter 113 for the remote party 142 in FIG. 1. The output devices can be a digital to analog (D/A) converter with an audio output device such as D/A converter 121 and audio output 150 for the remote party 142 and D/A converter 114 and audio output 116 for the local party 152. In some embodiments, a single device is both an input and output device. For example, the signal processor 140 receives acoustic signals as digital data from the remote party 142 and local party 152 through a data network such as the Internet or a circuit-switched telecommunications network using a single network interface device. The signal processor 140 sends output acoustic signals via the single network interface device as digital data. In other embodiments, the signal processor 140 receives acoustic signal data from multiple inputs and sends the echo-cancelled filtered acoustic signals through multiple outputs.

As described in more detail below, the echo cancellation system 50 overcomes the above-described obstacles to achieve robust echo cancellation in high noise and excessive double talk situations. The first step is to run a background canceller 107 (BG) and accumulate the value of the computed weights in an accumulation unit 108 for multiple samples of the acoustic signal generated by the remote party 142, which can include double-talk, and noise. The weights in the background canceller 107 are only updated when the remote party 142 is generating an acoustic signal. For example, the BG weights are updated when the remote party 142 is talking, but not when the local party 152 is talking and the remote party 142 is silent. In one embodiment, the background canceller 107 is applied to the signal from the remote party 142 at a sampling frequency of 8 KHz, although the rate can be higher or lower. Higher sampling rates allow a higher quality signal. Lower sampling rates can lead to lower power consumption in the signal processor 140 and enable lower-cost signal processing hardware in some embodiments. The signal processor 140 uses the time averaged filter weight values generated by the background canceller 107 to update a foreground canceller (FG) 100. In the presence of varying noise or double talk the generated filter weights for the background filter form a "cloud" around the point of exact convergence rather than being at the point of exact convergence. The signal processor 140 generates a sum of multiple sampled results from the BG filter for the weight computation in the accumulation unit 108, and then averages the sum with weights from the FG filter to generate weights in block 100 that are closer to the desired result even with high noise. The weight values in both the FG and BG filters are numeric parameters that affect the characteristics of each filter. The echo cancellation system 50 adjusts the weight parameters in the BG and FG filters to cancel the echo signal.

In the example of FIG. 1, the echo cancellation system generates samples for both the first and second acoustic signals over a series of times m. Each of the acoustic signals includes non-trivial energy components over a range of frequencies, and the echo cancellation system 50 generates weight values for each of a plurality of k frequency sub-bands. For example, audible speech is typically in a range of approximately 20 Hz-20 KHz. In one configuration, the frequency sub-bands are selected based on fixed-size frequency ranges such as 1.0 KHz or 0.5 KHz sub-bands. In another configuration, the k sub-bands have varying widths based on a logarithmic scale such as the octave scale. The signal processor 140 sums the filter weight values from block 107 in block 108 over a time series of samples m for each of k frequency sub-bands represented as $\overline{Wsum}_{m,k}(m,k)$, which is defined in Eq. 1.

$$\overline{Wsum}_{m,k}(m,k) = \overline{Wsum}_{m,k}(m-1,k) + \overline{Wbg}_{m,k}(m+1,k) \quad \text{Eq. 1}$$

In the example of FIG. 1, after the summed weight values $\overline{Wsum}_{m,k}(m,k)$ in block 108 have accumulated a predetermined number of values, represented as nWsumcountmax$_k$(k) for each of the k sub-bands, then the signal processor 140 divides the accumulated values $\overline{Wsum}_{m,k}(m,k)$ in block 108 by nWsumcountmax$_k$(k) to generate an average value $\overline{Wave}_{m,k}(m,k)$, which is defined in Eq. 2.

$$\overline{Wave}_{m,k}(m,k) = \frac{\overline{Wsum}_{m,k}(m,k)}{nWsumcountmax_k(k)} \quad \text{Eq. 2}$$

The averaged values for each of the k sub-bands are combined into the weights of the foreground filter in block 100. The foreground filter weights for a subsequent time period m+1 are updated using $\overline{Wave}_{m,k}(m,k)$, which is defined in Eq. 3.

$$\overline{Wfg}_{m,k}(m+1,k) = a_k(k) \cdot \overline{Wfg}_{m,k}(m,k) + (1-a_k(k)) \cdot \overline{Wave}_{m,k}(m,k) \quad \text{Eq. 3}$$

The $\overline{Wsum}_{m,k}(m,k)$ value in the background filter is subsequently reset to zero and the nWsumcount$_{m,k}$(m,k) counter of length nWsumcountmax$_k$(k) is reset to zero. In Eq. 3, the term $a_k$(k) is a relative weighting value of between 0 and 1 that is selected for each of the k sub-bands to provide a relative weight for the previous foreground filter value $\overline{Wfg}_{m,k}(m,k)$ and the averaged background filter value $\overline{Wave}_{m,k}(m,k)$. The value of $a_k$(k) is proportional to the weight assigned to the foreground filter value and inversely proportional to the weight assigned to the background filter update value. For example, if $a_k$(k)=0, then the average background filter value $\overline{Wave}_{m,k}(m,k)$ replaces the previous foreground filter weight value $\overline{Wfg}_{m,k}(m,k)$, and if $a_k$(k)=1, then the average background filter value $\overline{Wave}_{m,k}(m,k)$ is ignored during the update process in Eq. 3.

In the presence of high noise, if the magnitudes of the echo signal component and the noise signal component are similar, then the canceller 50 encounters difficulty in generating filter weights around the convergence point using Eq.1-Eq. 3. To counteract this problem, the update to the filter weighs should remain large enough in the presence of noise to converge at a reasonably fast rate. When using the normalized least means squares (NLMS) method, however, a large update to the weights in the background filter can also introduce instability in the filter when the weight values vary instead of converging. The prior art NLMS method is especially susceptible to high ambient noise or double talk in the acoustic signal generated by the local party 152.

A mathematical explanation of a novel modification to the NLMS method, referred to as Error Normalized Least Means Squares (E-NLMS), is described below with reference to the echo cancellation system 50 and signal processor 140. The echo cancellation system 50 receives the acoustic signal $Ain_{n,k}$(n,k) at time index n over k frequency sub-bands generated by the remote party 142 as a digital signal according to Eq. 4:

$$Ain_{n,k}(n,k) = \Sigma_{r=0}^{N_k-1} Ain_n(n-r) \cdot e^{-j\theta_k(n-r)} \cdot h_{LP_{n,k}}(r,k) \quad \text{Eq. 4}$$

In Eq. 4, $h_{LP_{n,k}}$(n,k) is the low pass filter for the sub-band k with length $N_k$ and $Ain_n$(n) is the real valued input sample sequence at time n extending back in time for $N_k$ sample periods.

The $\theta_k$ term in Eq. 4 is defined in Eq. 5:

$$\theta_k = 2\pi \cdot \frac{f_k}{f_s} \quad \text{Eq. 5}$$

where $f_k$ is the center frequency of the sub-band k of interest and $f_s$ is the sampling frequency of the A/D converter in block 113. The analysis filter block 115 generates a complex-valued representation $Ain_{n,k}$(n,k) of the acoustic signal from the remote party 142 from a series of real valued samples that are generated by the A/D converter 113. Because of the low-pass filtering in each frequency sub-band k, a down-sampled representation of the signal $Ain_{m,k}$(m,k) for times m is generated with a down-sampling factor $M_k$(k) using Eq. 6:

$$Ain_{m,k}(m,k) = Ain_{n,k}(m \cdot M_k(k),k) \quad \text{Eq. 6}$$

The E-NLMS method disclosed herein uses a series of the down-sampled complex values $Ain_{m,k}$(m,k) to update the weights in the background filter.

Since $Ain_{m,k}$(m,k) includes multiple samples generated over a series of time periods m, $\overline{X_{m,k}}$(m,k) represents a window of the values in $Ain_{m,k}$(m,k) over a fixed number $L_k$(k) of time periods in the past for each of the frequency sub-bands k. In some embodiments, the length of the window $L_k$ is the same for each of the frequency sub-bands k, while in other embodiments some of the frequency sub-bands have longer time windows than other sub-bands. In one configuration, the signal processor 140 includes larger values of $L_k$(k) for frequency sub-bands that contain a majority of the spectral energy for human speech. A more detailed description of applying time windows to frequency sub-bands is described in U.S. Pat. No. 5,548,642. A corresponding series $\overline{revX_{m,k}}$(m,k) represents a set of time-reversed values in $Ain_{m,k}$(m,k), which is useful for application in a convolution operation with a filter.

$$\overline{X_{m,k}}(m,k) = \begin{bmatrix} Ain_{m,k}(m,k) \\ Ain_{m,k}(m-1,k) \\ Ain_{m,k}(m-2,k) \\ \vdots \\ Ain_{m,k}(m-L_k(k)+1,k) \end{bmatrix} \quad \text{Eq. 7}$$

$$\overline{revX_{m,k}}(m,k) = \begin{bmatrix} Ain_{m,k}(m-L_k(k)+1,k) \\ Ain_{m,k}(m-L_k(k)+2,k) \\ Ain_{m,k}(m-L_k(k)+3,k) \\ \vdots \\ Ain_{m,k}(m,k) \end{bmatrix} \quad \text{Eq. 8}$$

The signal processor 140 applies a time delay to the signal from the remote party in the state variable delay line of block 101. The time delay corresponds to a delay between a time at which the analysis filter bank 115 generates the down-sampled signal $Ain_{m,k}$(m,k) and a time at which potential echoes from the signal $Ain_{m,k}$(m,k) are observed as part of the acoustic signal from the local party 152, local noise 153 and echo from the audio output 116.

In addition to receiving the acoustic signal from the remote party 142, the signal processor 140 receives an acoustic signal from the local party 152. A second analysis filter bank 117 generates a down-sampled complex valued representation $Bin_{m,k}(m,k)$ of the acoustic signal from the local party 152 local noise 153 and echo from the audio output 116. $Bin_{m,k}(m,k)$ is generated in a similar manner to $Ain_{m,k}(m,k)$ described above. The following equations Eq. 9 and Eq. 10 are analogous to Eq. 4 and Eq. 6 above, where the term $\theta_k$ corresponds to the sampling frequency for each frequency sub-band k in the A/D converter 118:

$$Bin_{n,k}(n,k) = \Sigma_{r=0}^{N_k-1} Bin_n(n-r) \cdot e^{-j\theta_k(n-r)} \cdot h_{LP_{n,k}}(r,k) \quad \text{Eq. 9}$$

$$Bin_{m,k}(m,k) = Bin_{n,k}(m \cdot M_k(k),k) \quad \text{Eq. 10}$$

As described above, the signal processor 140 implements both a foreground filter and a background filter. Each of the filters includes a weight vector for each of the frequency sub-bands k. Each weight vector is a complex valued vector that is convolved with the complex valued samples in each of the frequency sub-bands k over times m. $\hat{B}\,in_{fg_{m,k}}(m,k)$ is an estimated model of the echo within the acoustic signal from the local party 152, noise 153 and echo from the audio output 116 that is generated from the convolution of $\overline{revX_{m,k}}^T(m,k)$, which is a transposition of $\overline{revX_{m,k}}(m,k)$ from Eq. 8, with the weight values in the foreground filter $\overline{Wfg_{m,k}}(m,k)$ depicted in Eq. 11:

$$\hat{B}in_{fg_{m,k}}(m,k) = \overline{revX_{m,k}}^T(m,k) \cdot \overline{Wfg_{m,k}}(m,k) \quad \text{Eq. 11}$$

In the signal processor 140, block 102 performs the convolution to generate $\hat{B}\,in_{fg_{m,k}}(m,k)$. After generating an estimate of the echo signal, the signal processor 140 identifies a foreground error $e_{fg_{m,k}}(m,k)$ in block 109 with the summing unit 103 between the estimated echo $\hat{B}\,in_{fg_{m,k}}(m,k)$ and the observed signal $Bin_{m,k}(m,k)$ using Eq. 12:

$$e_{fg_{m,k}}(m,k) = Bin_{m,k}(m,k) - \hat{B}in_{fg_{m,k}}(m,k) \quad \text{Eq. 12}$$

The error $e_{fg_{m,k}}(m,k)$ increases when the signal $Bin_{m,k}(m,k)$ includes a large component corresponding to one or both of speech from the local party 152 and noise from the noise sources 153. In order to have zero error, the only component of $Bin_{m,k}(m,k)$ would be echo, and the estimate $\hat{B}\,in_{fg_{m,k}}(m,k)$ would have to perfectly model the echo signal based on the original signal $Ain_{m,k}(m,k)$. In a traditional NLMS process, the additional error introduced by the local party 152 and noise could cause instability. However, the E-NLMS process implemented in the echo cancellation system 50 as described above is less susceptible to the error $e_{fg_{m,k}}(m,k)$.

After calculating the error $e_{fg_{m,k}}(m,k)$ in each of the frequency sub-bands k, the signal processor 140 selectively updates the complex weight values in the background filter. In some cases, if the measured energy in a particular frequency sub-band k is below a predetermined threshold, the signal processor 140 ignores the frequency sub-band. Note that the energy to update a sub-band is based on the energy of the time delay values in 101 such than an echo may occur at 119. For example, if the energy level of a frequency sub-band $k_1$ is less than 3 dB above a measured noise floor in the signal at a time $m_1$, then the signal processor 140 ignores the frequency sub-band $k_1$ until a later time during which the energy in the frequency sub-band exceeds the predetermined threshold. Each of the sub-bands k can have different noise floors and energy threshold values. In the processor 140, block 104 identifies the frequency sub-bands k corresponding to weight values $\overline{Wbg_{m,k}}(m,k)$ in the background filter that should be updated. Block 112 limits the weight update to situations where the error [e] for the particular time m sub-band k exceeds the threshold. Additionally, if the total energy in the sub-band corresponds to the noise floor instead of to a signal, block 112 can optionally set the error value used to update the weights to 0 to effectively ignore the frequency sub-band k until a later time when the energy in the sub-band increases above the noise floor.

The signal processor 140 updates the weights of the selected frequency sub-bands k used in blocks 107 and 108 with the E-NLMS update process of block 104. By way of contrast, the prior art NLMS process updates the weights of the background filter using Eq. 13:

$$\overline{Wbg_{m,k}}(m+1,k) = \overline{Wbg_{m,k}}(m,k) + \frac{\mu_k(k) \cdot e_{fg_{m,k}}(m,k) \cdot \overline{x_{m,k}}(m,k)}{\|\overline{x_{m,k}}(m,k)\| \cdot \|\overline{x_{m,k}}(m,k)\|} \quad \text{Eq. 1}$$

In Eq. 13, $\overline{Wbg_{m,k}}(m,k)$ represents the weights used at time index m, and sub-band index k, $\overline{Wbg_{m,k}}(m+1,k)$ represents the weights to be used at time index "m+1", and sub-band index k, $\overline{X_{m,k}}^*(m,k)$ is the complex conjugate of the state variable vector given in Eq. for the complex case, $\mu_k(k)$ is a sub-band specific constant for sub-band k, $e_{fg_{m,k}}(m,k)$ is the foreground error at time index m, sub-band index k. $\|\overline{X_{m,k}}(m,k)\|$ is proportional to the acoustic signal energy from the remote party 142 at time index m, sub-band index k. One example of an equation to identify the energy provided as a Euclidean norm in Eq. 14:

$$\|\overline{X_{m,k}}(m,k)\| = \sqrt{\Sigma_{r=0}^{L-1}(Ain_{m,k}(m-r,k) \cdot Ain_{m,k}^*(m-r,k))} \quad \text{Eq. 2}$$

In Eq. 13, the denominator $\|\overline{X_{m,k}}(m,k)\| * \|\overline{X_{m,k}}(m,k)\|$ assures stability of the weight updates when the constant value $\mu_k(k)$ is in the range $0<\mu<=2$. One deficiency of the NLMS process of Eq. 13 occurs when the signal energy $\|\overline{X_{m,k}}(m,k)\|$ has a comparatively large value, which leads to smaller update values to the corresponding background filter weight $\overline{Wbg_{m,k}}(m+1,k)$, and slower convergence of the background filter.

The E-NLMS process in the signal processor 140 implements a novel alternative updating technique for the weight of the background filter $\overline{Wbg_{m,k}}(m+1,k)$ depicted in Eq. 15 and Eq. 16:

$$\overline{Wbg_{m,k}}(m+1,k) = \overline{Wbg_{m,k}}(m,k) + \frac{\mu_k(k) \cdot e_{fg_{m,k}}(m,k) \cdot \overline{x_{m,k}}(m,k)}{\varepsilon_{m,k}(m,k) \cdot \|\overline{x_{m,k}}(m,k)\|} \quad \text{Eq. 15}$$

$$\varepsilon_{m,k}(m,k) = \max(|e_{fg_{m,k}}(m,k)|, e\_min_k(k)) \quad \text{Eq. 16}$$

The denominator of the update term in Eq. 15 differs from the denominator in Eq. 13. The $\epsilon_{m,k}(m,k)$ value, which is defined in Eq. 16, represents the maximum of either the absolute values of the measured error $e_{fg_{m,k}}(m,k)$, or a predetermined minimum value $e\_min_k(k)$, which corresponds to the frequency sub-band k. When $e_{fg_{m,k}}(m,k)$ is a complex valued number, the true Euclidean absolute valued magnitude or an approximation of the magnitude based on the sum of the absolute values of the real and imaginary components of the error value can be used in Eq. 15 and Eq. 16 for computational efficiency. During an iterative update process after resetting the weights in the background filter, the error value $|e_{fg_{m,k}}(m,k)|$ tends to be large and is larger than the corresponding $e\_min_k(k)$ value. In Eq.15, the $e_{fg_{m,k}}(m,k)$ term in the numerator and the $\epsilon_{m,k}(m,k)$ term in the denominator of the update value cancel each other in terms of magnitude, and the update values tend to converge faster for larger errors than is the case in Eq. 13. After one or more updates, the error values $e_{fg_{m,k}}(m,k)$ tend to decrease as the background filter more accurately models the echo signal. The minimum value $e\_min_k(k)$ ensures a minimum value of the denominator so that the update value does not grow too large and produce instability in the background filter as the error value $e_{fg_{m,k}}(m,k)$ decreases.

In Eq. 15, if $\mu_k(k)$ is between 0.01 and 0.05 then $e_{fg_{m,k}}(m,k)$ multiplied by $\overline{X_{m,k}}^*(m,k)$ is a vector, and if divided by $|e_{fg_{m,k}}(m,k)|^*||\overline{X_{m,k}}(m,k)|,|$ then the vector approximates a unity vector. When $\mu_k(k)=0.01$, then $\mu_k(k)$ represents a 1% correction, in which the weight value update of Eq. 15 performs a 1% linear step towards the final solution during each update. So the value selected for $\mu_k(k)$ can be varied to provide improved stability with a slower convergence time for values near zero, and a faster convergence time with reduced stability for values approaching 2.

Figure 3:
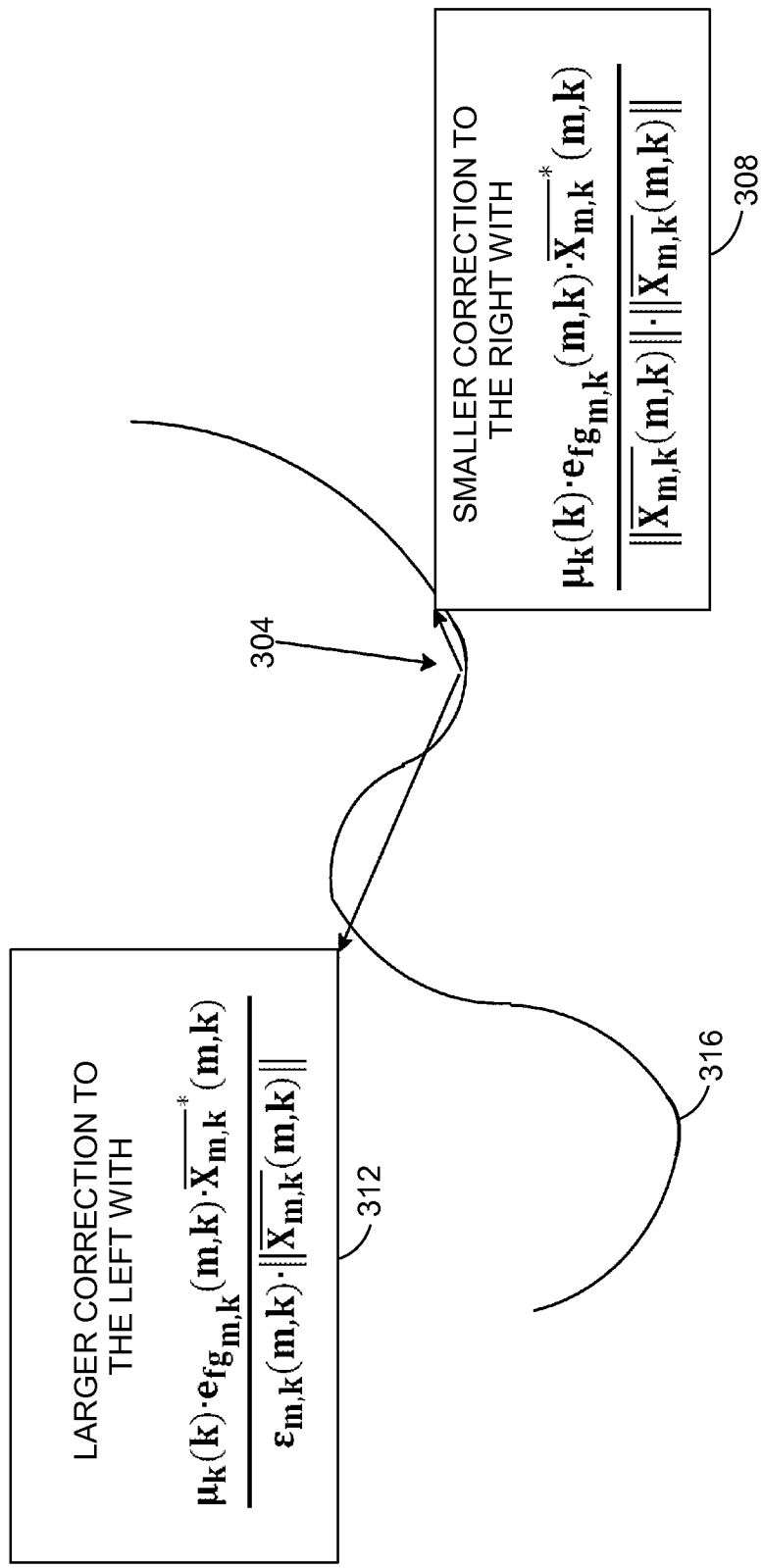
FIG. 3 is a diagram of a local minimum in echo cancellation performance in an adaptive echo cancelling filter.

Another observed problem with the NLMS equation is the weights do not always converge to the same set of weights; even with low noise. The weights seem to freeze at a different convergence point when the canceller is started and run for some period of time and then the final weights are observed. As the NLMS algorithm approaches the final solution the update gets very small as described above, because the error becomes very small. So the local minimum would not need to be very deep to cause the NLMS algorithm to not be able to "get up the hill" to continue on to the desired solution. The E-NLMS process disclosed herein ensures that the update to the background filter weight is large enough to reduce the likelihood of converging to a non-globally optimal minimum such as the local minimum 304 depicted in FIG. 3. In FIG. 3, the update 308 using the prior art Eq. 13 is insufficient to overcome the boundaries around the local minimum 304. The larger update 312 generated using Eq. 15, however, enables the E-NLMS process to avoid being trapped in a local minimum and to identify more optimal minimum error values, such as the second minimum 316.

The signal processor 140 continually updates the weights for the background filter in each of the selected frequency sub-bands k. In one embodiment, the signal processor 140 stores a plurality of weight values that are assigned to each of the frequency sub-bands k over m time periods beginning from a previous reset of the background filter. In block 108, the signal processor 140 sums and averages the weight values to improve the stability of the weights generated for the background filter. The processor 140 updates the corresponding weights in the foreground filter using the averaged background weights.

While Eq. 15 provides an E-NLMS update process for a complex-valued signal over multiple sub-bands, the E-NLMS update can also be applied to a single frequency-band signal with real valued samples. For example, in a single frequency band real-valued signal, there is only one signal value that varies over time m with real-valued entries at each time for the acoustic signals from both the remote party 142 and the local party 152. Eq. is an exemplary equation of E-NLMS in the real-valued case:

$$\overline{Wbg_m}(m+1) = \overline{Wbg_m}(m) + \frac{\mu \cdot e_{fg_{m,k}}(m) \cdot \overline{x_m}(m)}{\varepsilon_m(m) \cdot ||\overline{x_m}(m)||} \qquad \text{Eq. 3}$$

Referring again to the complex signal case, the signal processor 140 updates the foreground filter with the weights calculated in the background filter after the error generated by the background filter has decreased below the error generated by the foreground filter for a predetermined time period. The estimated echo signal generated with the background filter $\hat{B}$ $in_{bg_{m,k}}(m,k)$ and the error $e_{bg_{m,k}}(m,k)$ between the estimated echo signal generated with the background filter and the actual signal from the audio output 116 are provided in Eq. and Eq. below:

$$\hat{B}in_{bg_{m,k}}(m,k) = \overline{revX_{m,k}}^T(m,k) \cdot \overline{Wbg_{m,k}}(m,k) \qquad \text{Eq. 4}$$

$$e_{bg_{m,k}}(m,k) = Bin_{m,k}(m,k) - \hat{B}in_{bg_{m,k}}(m,k) \qquad \text{Eq. 5}$$

In the signal processor 140, block 111 convolves the background filter with weights $\overline{Wbg_{m,k}}(m,k)$ with the delayed signal values $\overline{revX_{m,k}}^T(m,k)$ from the remote party 142. The blocks 106 and 110 identifies the background error $e_{bg_{m,k}}(m,k)$ between the actual acoustic signal $Bin_{m,k}(m,k)$ from 119 and the estimated signal $\hat{B}$ $in_{bg_{m,k}}(m,k)$. After the magnitude of $e_{bg_{m,k}}(m,k)$ drops below $e_{fg_{m,k}}(m,k)$ for a predetermined number of consecutive time periods, the signal processor 140 replaces the weight for the frequency sub-band k in the foreground filter $\overline{Wfg_{m,k}}(m,k)$ with the corresponding weight $\overline{Wbg_{m,k}}(m,k)$ at block 105. In some configurations the entire set of weights from the background filter are transferred to the foreground filter in bulk instead of only transferring weight values for individual frequency sub-bands.

As described above, the foreground filter (FG) is periodically updated with weight values from the adaptive background filter. To generate an output, the echo cancellation system 50 applies the foreground filter to the acoustic signal at 119. The foreground filter reduces or eliminates the components of the acoustic signal that include the components of the audio output 116. In the signal processor 140, the synthesis filter bank 120 synthesizes the measured errors from the frequency domain into a time domain signal. In an embodiment where the input signal is down-sampled into multiple frequency sub-bands, the output signal is an upsampled synthesis of each of the errors $e_{fg_{n,k}}(n,k)$ generated between the foreground filter and $Bin_{n,k}(n,k)$. As described above, the term "error" in this context represents the components in the input signal $Bin_{n,k}(n,k)$ other than the echo components, where the echo components are substantially removed by the foreground filter once the filter has trained. The error $e_{fg_{n,k}}(n,k)$, corresponding output signal for an individual frequency sub-band k, and combined output for all of the frequency sub-bands k are provided by Eq.-Eq., respectively:

$$e_{fg_{n,k}}(n,k) = M_k(k) \cdot \qquad \text{Eq. 20}$$

$$\sum_{m=0}^{\frac{N_{IRLP_k}}{M_k(k)}-1} h_{IRLP_{n,k}}\left(mM_k(k) + ((n))_{M_k}\right) \cdot e_{fg_{m,k}}\left(\left\lfloor\frac{n}{M_k(k)}\right\rfloor - m\right)$$

$$Bout_{n,k}(n,k) = 2 \cdot Re\left(e_{fg_{m,k}}(n,k) \cdot e^{j\theta_k n}\right) \qquad \text{Eq. 26}$$

$$Bout_n(n) = \sum_{k=0}^{K} Bout_{n,k}(n,k) \qquad \text{Eq. 22}$$

In Eq., the term $((n))_{M_k}$ represents the n modulo $M_k$ of the up-sampling factor. The top open bracket operator $$\left\lfloor\frac{n}{M_k}\right\rfloor$$

is the integer less than or equal to $$\frac{n}{M_k}$$

or equivalently the "C" language library floor( ) function.

Bout$_n$(n) is a digital acoustic output signal generated by the synthesis filter bank 120 in the signal processor 140. The digital signal is typically transmitted over a network to the D/A converter 121, and the audio output 150 generates sounds from an analog acoustic signal generated by the D/A converter 121. The echo cancellation system 50 reduces or eliminates echo in Bout$_n$(n) that returns to the remote party 142 from the original acoustic signal generated by the remote party 142.

Some existing NLMS processes identify situations where there is double-talk or noise in the acoustic signal received from the local party 152 and cease updates to the foreground and background filters during echo cancellation. One drawback with the existing approaches is that a path change between the acoustic signals between the remote party 142 and local party 152 often occurs when the updates to the filters have been suspended, resulting in sub-optimal filtering. One problem is the onset of double talk as the acoustic signal from the remote party 142 trails off and the local party 152 begins to speak in anticipation of the remote party 142 finishing. A path change and double talk can also occur simultaneously. In this case, the existing NLMS process in Eq. has a large numerator value due to a large error value $e_{fg_{m,k}}(m,k)$, while the denominator is small as the speech of the remote party 142 trails off. Thus, a large update to the filter weights occurs at a time when the acoustic signal from the remote party 142, which is the source of the echo, is fading and the large update produces errors in the echo cancellation process.

With E-NLMS used in Eq. and $\mu_k(k)=0.02$ (for example) a much smaller update is performed; since the signal processor 140 includes $\epsilon_{m,k}(m,k)$ in the denominator of Eq. 15, which typically has a large value during double-talk and when the local party 152 is in a noisy environment or when the local party 152 is speaking. In an exemplary embodiment, the weight values in the background filter of the cancellation system 50 canceller continue to update during situations where there is double-talk. Using the E-NLMS process described above, the background filter receives updates even when double-talk occurs frequently or when the only non-trivial acoustic signals occur during double-talk. Even when the echo cancellation system 50 is updated during double talk, the echo cancellation performance remains robust.

Note that if double talk occurs, then the weight updates due to the local talker will approximate random values about the point of convergence, since the local talker is uncorrelated, and the sum of the random values will be approximately the point of convergence so little divergence will occur if we continue to update the weights even with double talk occurring.

Figure 4:
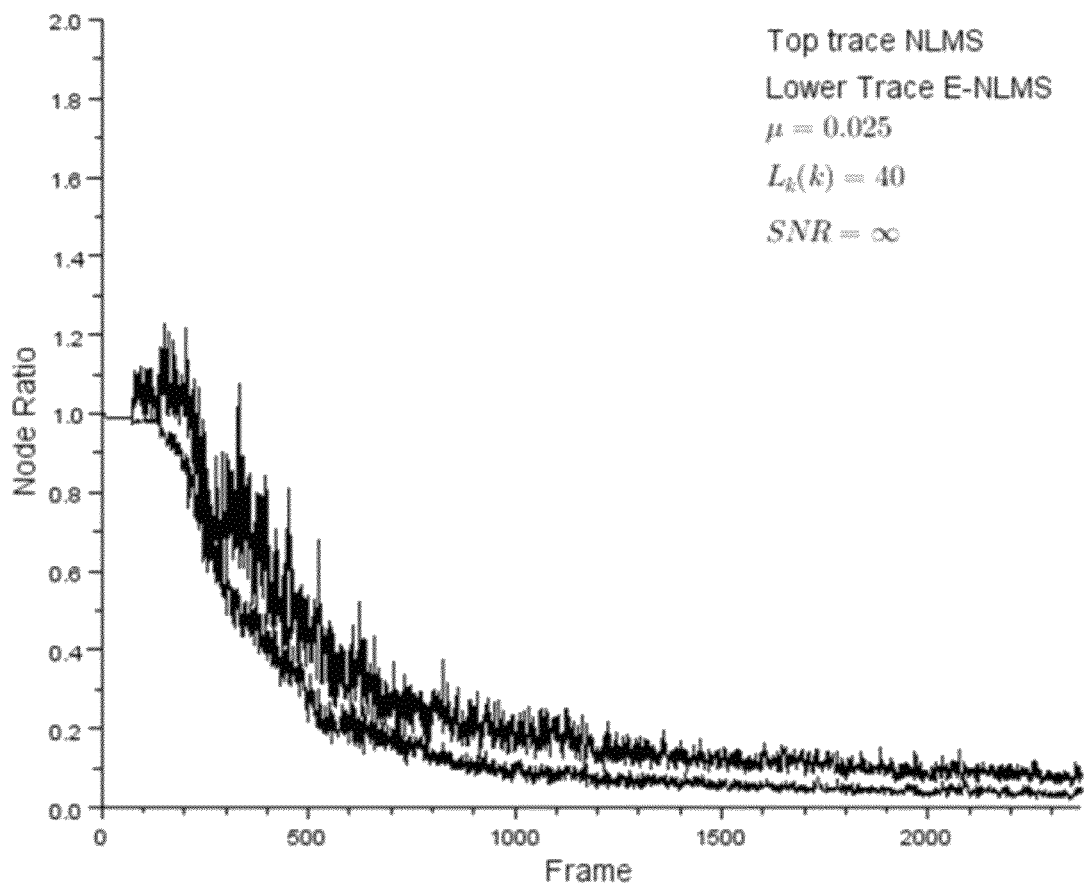
FIG. 4 is a graph of a prior art normalized least means squares (NLMS) adaptive filter compared to an error normalized least means squares (E-NLMS) adaptive filter described in this document filtering an echo signal with zero noise.
Figure 5:
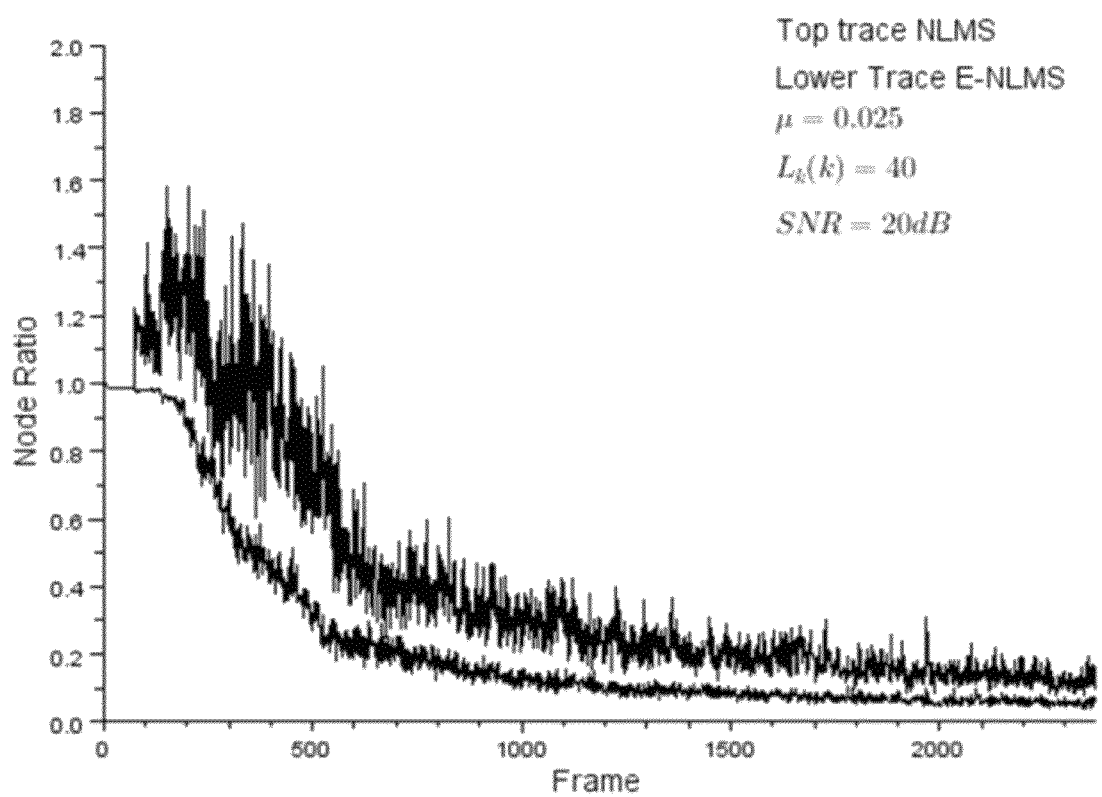
FIG. 5 is a graph of a prior art NLMS adaptive filter compared to the E-NLMS adaptive filter described in this document filtering an echo signal with a 20 dB signal to noise ratio.
Figure 6:
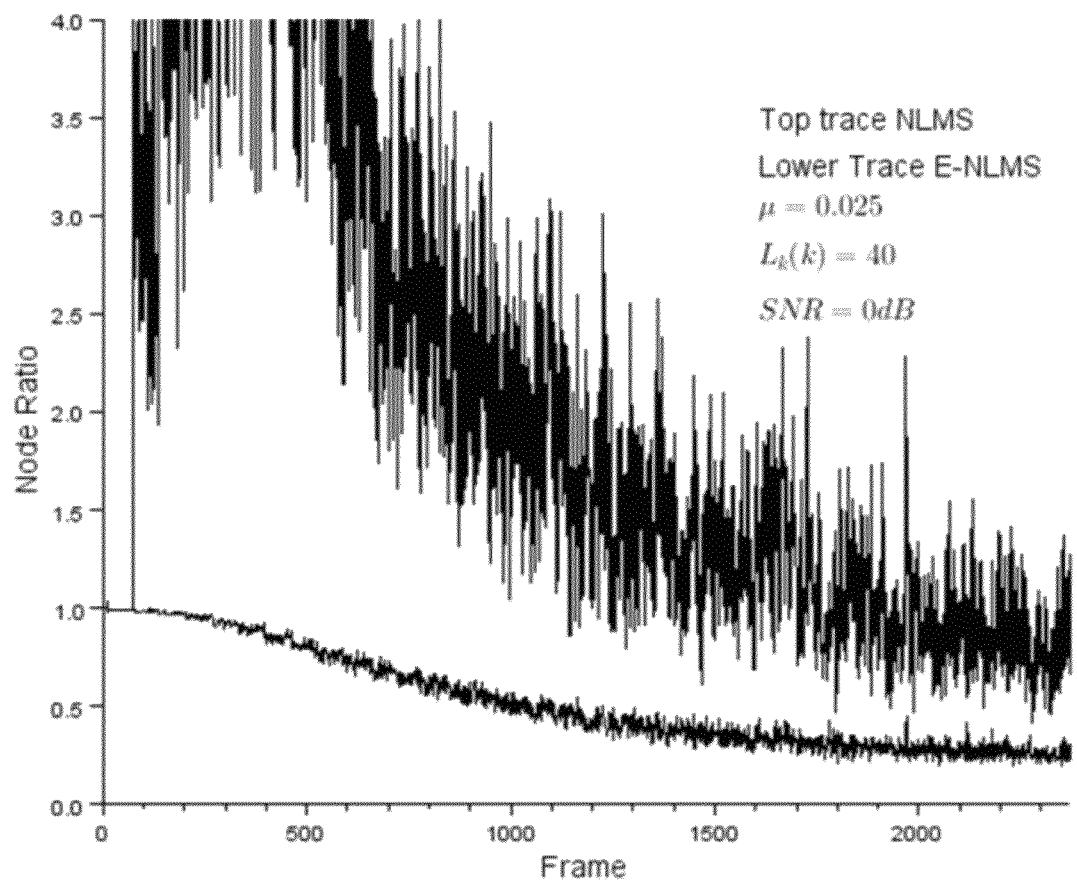
FIG. 6 is a graph of a prior art NLMS adaptive filter compared to the E-NLMS adaptive filter described in this document filtering an echo signal with a 0 dB signal to noise ratio.

FIG. 4-FIG. 6 depict simulations of the relative performance of a prior art adaptive filter that performs echo cancellation using NLMS and a new adaptive filter that performs echo cancellation with the E-NLMS method described above. In FIG. 4, the two filters perform echo cancellation in a noise-free environment where the only signal is the echo, and the signal-to-noise ratio (SNR) is effectively infinite. In FIG. 5, the two filters perform echo cancellation in a moderate noise environment where the SNR of the echo signal to the environmental noise is 20 dB. In FIG. 6, the two filters perform echo cancellation in a high noise environment where the strength of the echo signal is equivalent to the strength of the noise signal with an SNR of 0 dB. The noise in the simulation corresponds to the noise source 153 of FIG. 1. The only change between the three figures is the selected level of environmental noise.

FIG. 4-FIG. 6 are generated using a simulation of a sub-band implementation with a 64 point fast-fourier transform (FFT), which produces 31 complex bands. The Node Ratio shown on the y-axis is the square root of the sum of the squares of the real and imaginary parts of all 31 complex bands corresponding to the output of the summing unit 103 in the echo cancellation system 50 of FIG. 1. The node ratio corresponds to a sum of all 31 complex bands divided by the square root of the sum of the squares of the real and imaginary parts of the 31 complex bands prior to the summing unit 103. This gives a coherent cancellation value across the echo canceller subtraction node.

The frame numbers shown in the x-axis in FIG. 4-FIG. 6 depict a series of discrete time intervals. One frame of data is 4 milliseconds, and 250 frames of data correspond to one second of processing. FIG. 4-FIG. 6 depict 2500 frames or 10 seconds of real time data on the x-axis.

In the example of FIG. 4-FIG. 6, the number of taps for each sub-band is $L_k(K)=40$. The sub-band implementation used an overlap add method with a block size of 32 samples. This results in each tap covering 4 mS so the 40 tap length realizes a canceller of 160 milliseconds. The value $\mu=0.025$ is used in each of FIG. 4-FIG. 6.

As depicted in each of FIG. 4-FIG. 6, the E-NLMS adaptive filter has a lower node ratio value and approaches a node ratio value of 0 more quickly than the traditional NLMS filter over time. Additionally, the node ratio values for the E-NLMS adaptive filter have a lower frame-to-frame variation than in the traditional NLMS adaptive filter, which indicates that the E-NLMS filter is more stable in a noisy environment. While the E-NLMS filter shows the greatest degree of improvement over the NLMS filter in the high-noise environment of FIG. 6, the E-NLMS filter also has a performance advantage in zero-noise and low noise environments. In particular, FIG. 6 depicts a situation where the traditional NLMS filter diverges at start up and then returns to a point where there is little cancellation. By contrast, the E-NLMS settles out at 12 dB (0.25 ratio) of cancellation. The noisy environment depicted in FIG. 6 exemplifies the robust nature of the E-NLMS adaptive filter.

Figure 2:
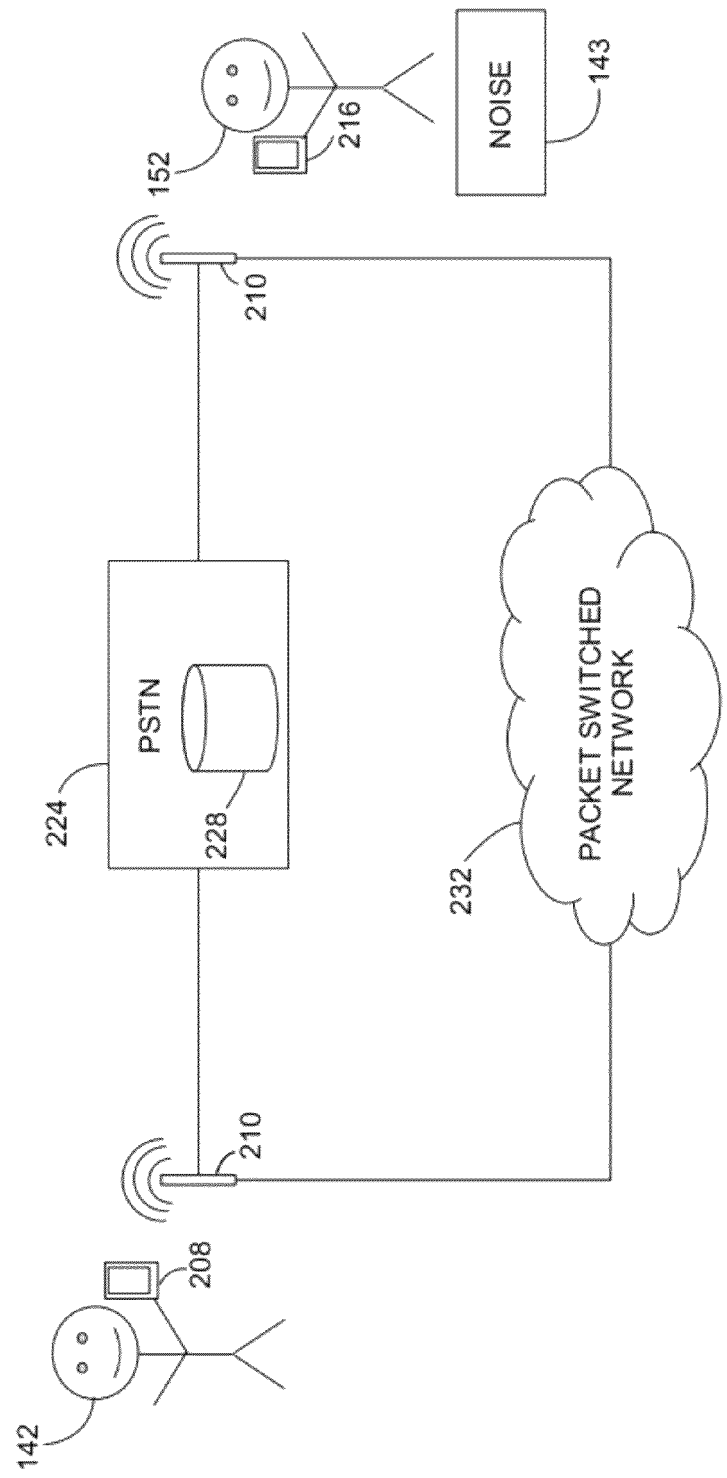
FIG. 2 is an exemplary diagram of telecommunication networks and devices that include the echo cancellation system of FIG. 1.

The echo cancellation system 50 can be incorporated into a wide variety of telecommunication systems. FIG. 2 depicts a simplified view of the remote party 142 and local party 152. In the example of FIG. 2, both the remote party 142 and local party 152 communicate with mobile telephones 208 and 216, respectively. Mobile telephone 208 communicates with a cellular tower 210 and mobile telephone 216 communicates with another cellular tower 210. Digital data corresponding to sounds received by both of the mobile telephones 208 and 216 are transmitted over a data network such as the Public Services Telephone Network (PSTN), which is a circuit-switched network, or over a packet switched network 232, such as the Internet.

In one embodiment, both of the mobile phones 208 and 216 incorporate the echo cancellation system 50 of claim 1. For example, the mobile phone 208 cancels audio echoes in acoustic signals that are received from the mobile phone 216 so that the echo is not transmitted back to the mobile phone 216. Similarly, the mobile phone 216 cancels audio echoes in acoustic signals that are received from the mobile phone 208. In some instances, only one of the mobile phones includes the echo cancellation system 50. The echo cancellation system 50 in one of the mobile phones 208 or 216 cancels some or all of the echoes in the acoustic signals between the remote party 142 and local party 152.

While FIG. 2 depicts mobile telephones 208 and 216, the echo cancellation system 50 can be incorporated with any telephonic device including, but not limited to, wired telephones, speaker phones, and any digital devices that are configured to communicate via a packet-switched protocol such as Voice-over-Internet Protocol (VoIP). In a typical VoIP embodiment, the end-point devices, such as the telephonic devices, typically implement the echo cancellation system 50 using either specialized signal processing hardware, echo cancellation software executed on a digital processing device, or a combination of hardware and software. In embodiments where an end-point device lacks a combination of hardware and software that implements the echo cancellation system 50, such as with "plain old telephone service" (POTS) that access the PSTN, the echo cancellation system 50 can be implemented within the fabric of the network in a network device 228 such as a central office switch or a Private Branch exchange (PBX) device. In an embodiment where the echo cancellation system 50 is implemented within the central office switch or PBX 228, the single echo cancellation system 50 cancels echoes in the acoustic signals between both the remote party 142 and local party 152.

In yet another embodiment, the remote party 142 and local party 152 communicate via a direct or indirect radio link such as through direct single-side band (SSB) voice communications or indirectly through a radio repeater. Either or both of the radio transceivers used by the local and remote parties can include the echo cancellation system 50. More broadly, the echo cancellation system 50 can be incorporated into any communication system to provide echo cancellation for digitized acoustic signals.

It will be appreciated that variants of the above-disclosed and other features, and functions, or alternatives thereof, may be desirably combined into many other different systems or applications. For example, while the example embodiments described above are directed to filtering of complex valued signals over multiple frequency sub-bands, the echo cancellation system 50 can also operate over a single frequency band using real-valued signals. Various presently unforeseen or unanticipated alternatives, modifications, variations, or improvements therein may be subsequently made by those skilled in the art, which are also intended to be encompassed by the following claims.

APPENDIX

Pseudo Code for Algorithm
Initial Conditions
    nWsumcount$_{m,k}$(0,k)=0
    $\overline{Wsum_{m,k}}$(0,k)=0
    $\overline{Wfg_{m,k}}$(0,k)=0
    $\overline{Wbg_{m,k}}$(0,k)=0
    noiseFloor$_{m,k}$(0,k)=γ /*γ typically is in the range of 0.005·Digital full scale*/nBkGndB
    nBkGndBetterCntr$_{m,k}$(0,k)=0
Configuration Parameters
    $f_s$ is the sampling rate of the analog to digital converts in blocks 113 and 118.
    $L_k$(k); integer length of the signal vectors in block 101.
    $h_{lp_{n,k}}$(n,k); FIR low-pass filters in time index dimension n, for each sub-band k used in blocks 115 and 117.

$h_{IRLP_{n,k}}$(n,k); FIR image-rejection low-pass filter in time index dimension n, for each sub-band k used in block 120.
$N_{IRLP_k}$(k); length of $h_{IRLP_{n,k}}$(n,k) image rejection low pass filter for each sub-band k used in block 120.
$N_k$; length of $h_{lp_{n,k}}$(n,k) low pass basis filter for each sub-band k, used in blocks 115 and 117.
$M_k$(k); integer down-sample factor in blocks 115 and 117 for each sub-band k. Also the integer up-sample factor in block 120.
$e_{min_k}$(k); Limit for the error.
XminLevel$_k$(k); threshold to declare enough energy to update the weights.
noiseFactor$_k$(k);
nWsumcountmax$_k$(k); positive integer constant.
$\alpha_k$(k); real valued constants, $0<\alpha_k(k) \le 1$ for each sub-band k used in block 100 to determine rate at which the foreground weights adapt for standard update.
nBulkMoveThreshold$_k$(k)
nBkGndBetterCntrMin$_k$(k)
$\beta_k$(k)

Pseudo Code
The pseudo code below is the typical processing for time index m=1 to ∞; with m=0 the initial conditions and for sub-band index k=0 to K−1.

bXvalid$_{m,k}$(m,k)=||$\overline{X_{m,k}}$(m,k)||>(XminLevel$_k$(k)+noiseFactor$_k$(k)·noiseFloor$_{m,k}$(m,k))
IF bXvalid$_{m,k}$(m,k)
    $\epsilon_{fg_{m,k}}$(m,k)=max(|e$_{fg_{m,k}}$(m,k)|, e$_{min_k}$(k))

$$\overline{\omega_{m,k}}(m,k) = \overline{Wbg_{m,k}}(m,k) + \frac{\mu \cdot e_{m,k}(m,k) \cdot \overline{X_{m,k}}^*(m,k)}{\varepsilon(m,k) \cdot \|\overline{X_{m,k}}^*(m,k)\|}$$

$\overline{\omega_{m,k}}$(m,k)=$\overline{Wsum_{m,k}}$(m−1,k)+$\overline{\omega_{m,k}}$(m,k)
    nWsumcount$_{m,k}$(m,k)=nWsumcount$_{m,k}$(m−1,k)+1
    bNormalUpdateW$_{m,k}$(m,k)=nWsumcount$_{m,k}$(m,k)≥nWsumcountmax$_k$(k)
    IF bNormalUpdateW$_{m,k}$(m,k)

$$\overline{Wave_{m,k}}(m,k) = \frac{\overline{Wsum_{m,k}}(m,k)}{nWsumcountmax_k(m,k)}$$

$\overline{Wfg_{m,k}}$(m+1,k)=$\alpha_k$(k)·$\overline{Wfg_{m,k}}$(m,k)+(1−$\alpha_k$(k))·$\overline{Wave_{m,k}}$(m,k)
    $\overline{Wsum_{m,k}}$(m,k)=0
    nWsumcount$_{m,k}$(m,k)=0
    ELSE
    $\overline{Wfg_{m,k}}$(m+1,k)=$\overline{Wfg_{m,k}}$(m,k)
    ENDIF
    Wbg$_{m,k}$(m+1,k)=$\overline{\omega_{m,k}}$(m,k)
    bBkGndBetterCntr$_{m,k}$(m,k)=(e$_{bg_{m,k}}$(m,k)·e$_{bg_{m,k}}$*(m,k))<(e$_{fg_{m,k}}$(m,k)·e$_{fg_{m,k}}$*(m,k)·$\beta_k$(k))
    IF bBkGndBetterCntr$_{m,k}$(m,k)
    nBkGndBetterCntr$_{m,k}$(m,k)=nBkGndBetterCntr$_{m,k}$(m−1,k)+1
    bBulkMove$_{m,k}$(m,k)=nBulkMoveCntr$_{m,k}$(m,k)≥nBulkMoveThreshold$_k$(k)
    IF bBulkMove$_{m,k}$(m,k)
    nBkGndBetterCntr$_{m,k}$(m,k)=0
    $\overline{Wfg_{m,k}}$(m+1,k)=$\overline{Wbg_{m,k}}$(m,k)
    $\overline{Wsum_{m,k}}$(m,k)=0
    nWsumcount$_{m,k}$(m,k)=0

ENDIF
ELSE
nBkGndBetterCntr$_{m,k}$(m,k)=nBkGndBetterCntr$_{m,k}$(m−1,k)−1
IF nBkGndBetterCntr$_{m,k}$(m,k)<nBkGndBetterCntrMin$_k$(k)
nBkGndBetterCntr$_{m,k}$(m,k)=nBkGndBetterCntrMin$_k$(k)
ENDIF
ENDIF
ELSE
$\overline{Wsum}_{m,k}$(m,k)=$\overline{Wsum}_{m,k}$(m−1,k)
nWsumcount$_{m,k}$(m,k)=nWsumcount$_{m,k}$(m−1,k)
$\overline{Wbg_{m,k}}$(m+1,k)=$\overline{Wbg_{m,k}}$(m,k)
$\overline{Wfg_{m,k}}$(m+1,k)=$\overline{Wfg_{m,k}}$(m,k)
ENDIF The present disclosure thus contemplates an echo canceller that includes the following:

1. A means to perform the convolution 102 of the state variable delay line 101 and the computed weights 100.
2. A means to find the difference of the convolution output 102 and the desired signal; input to 103.
3. A means to update the weights to a background set of weights 107 via the update 104 of $$\overline{Wbg_{m,k}}(m+1,k) = \overline{Wbg_{m,k}}(m,k) + \frac{\mu_k(k) \cdot e_{fg_{m,k}}(m,k) \cdot \overline{X_{m,k}}^*(m,k)}{\left|e_{fg_{m,k}}(m,k)\right| \cdot \|\overline{X_{m,k}}^*(m,k)\|},$$

where $e_{fg_{m,k}}$(m,k) is the error which can be complex for the sub band case and $\overline{X_{m,k}}^*$(m,k) is the conjugate of $\overline{X_{m,k}}$(m,k) for the complex case.

4. A means to limit (112) the $|e_{fg_{m,k}}$(m,k)$|$ value in 107 to some larger value should the value become too small to assure stability.
5. A means to accumulate the weights changes 108 for some number of frames N each time a set of weights is updated.
6. A means to average those weights with the foreground weights 100 after the number of accumulated weight updates N
7. A means to count the frames where the BG Error 110 is better than the FG error 109 for some number of frames Y.
8. When above detection of BG error 110 is better than FG error 109 for Y frames then the BG Weights 107 will be moved to the FG Weights 100.
9. When the above Weight move occurs by moving the weights from 107 to 100 the accumulation in 108 will be set to 0 to be restarted and the N frame counter will also be set to 0.

I claim:

1. An echo cancellation system comprising:
an input device configured to receive a first acoustic signal from a first telephonic device and a second acoustic signal from a second telephonic device;
an output device configured to generate an output acoustic signal; and
a signal processor operatively connected to the input device and the output device, the signal processor being configured to:
apply a first echo cancellation filter to the first acoustic signal to generate an estimated model of an echo generated by the first acoustic signal through the second telephonic device;
identify a difference between the estimated model and the second acoustic signal;
identify a maximum value corresponding to a maximum of (1) the identified difference between the estimated model and the second acoustic signal and (2) a predetermined minimum value;
generate a plurality of values corresponding to the first acoustic signal over a series of time intervals;
update a parameter in a second echo cancellation filter with reference to a product of the identified difference and a complex conjugate of the plurality of values divided by a product of the maximum value and a magnitude of the plurality of identified values;
apply the updated parameter in the second echo cancellation filter to the first echo cancellation filter;
apply the first echo cancellation filter with the updated parameter to the second acoustic signal to generate a second filtered acoustic signal that reduces or eliminates an echo corresponding to the first acoustic signal; and
output the second filtered acoustic signal through the output device.

2. The echo cancellation system of claim 1, the signal processor being further configured to:
identify a first difference between the estimated model and the second acoustic signal in a first frequency sub-band of both the first and second acoustic signals;
identify a second difference between the estimated model and the second acoustic signal in a second frequency sub-band of both the first and second acoustic signals;
identify a first maximum value corresponding to a maximum of (1) the first identified difference between the estimated model and the second acoustic signal and (2) a first predetermined minimum value;
identify a second maximum value corresponding a maximum of (1) the second identified difference between the estimated model and the second acoustic signal and (2) a second predetermined minimum value;
generate a first plurality of values corresponding to the first acoustic signal in the first frequency sub-band over the series of time intervals;
generate a second plurality of values corresponding to the first acoustic signal in the second frequency sub-band over the series of time intervals;
update a first parameter in the second echo cancellation filter with reference to a product of the first identified difference and a complex conjugate of the first plurality of values divided by a product of the first maximum value and a magnitude of the first plurality of identified values;
update a second parameter in the second echo cancellation filter with reference to a product of the second identified difference and a complex conjugate of the second plurality of values divided by a product of the second maximum value and a magnitude of the second plurality of identified values;
apply the first and second updated parameters from the second echo cancellation filter to the first echo cancellation filter; and
apply the first echo cancellation filter with the first updated parameter and the second updated parameter to the second acoustic signal to generate the second filtered acoustic signal.

3. The echo cancellation system of claim 2, wherein the signal processor updates the first parameter in the second echo cancellation filter with further reference to a first predetermined constant value corresponding to the first frequency sub-band, and the signal processor updates the second parameter in the second echo cancellation filter with further reference to a second predetermined constant value corresponding to the second frequency sub-band.

4. The echo cancellation system of claim 1, the signal processor being further configured to:
apply the second echo cancellation filter to the first acoustic signal to generate a third filtered acoustic signal;
identify another difference between the third filtered acoustic signal and the second acoustic signal; and
apply the updated parameter from the second echo cancellation filter to the first echo cancellation filter in response to the other difference between the third filtered acoustic signal and the second acoustic signal being smaller than the difference between the estimated model and the second acoustic signal.

5. The echo cancellation system of claim 1, wherein the signal processor is incorporated in a central office switch in a telephone network.

6. The echo cancellation system of claim 1, wherein the signal processor is incorporated in at least one of the first and second telephonic devices.

7. The echo cancellation system of claim 1, the signal processor being further configured to:
identify an average value of the updated parameter in the second echo cancellation filter and at least one other value of the parameter in the second echo cancellation at a previous time; and
apply the average value of the updated parameter in the second echo cancellation filter to the first echo cancellation filter.

8. The echo cancellation system of claim 7, wherein the signal processor updates the parameter of the first echo cancellation filter with a sum of a previous value of the parameter in the first echo cancellation filter multiplied by a first weight factor and the average value of the updated parameter in the second echo cancellation filter multiplied by a second weight factor, a sum of the first weight factor and the second weight factor being one.

9. A method of echo cancellation comprising:
applying a first echo cancellation filter to a first acoustic signal received from a first telephonic device through an input device to generate an estimated model of an echo generated by the first acoustic signal through a second telephonic device;
receiving a second acoustic signal from the second telephonic device;
a signal processor connected to the input device and an output device;
identifying a difference between the estimated model and the second acoustic signal with the signal processor;
identifying a maximum value corresponding to a maximum of (1) the identified difference between the estimated model and the second acoustic signal and (2) a predetermined minimum value with the signal processor;
generating a plurality of values corresponding to the first acoustic signal over a series of time intervals with the signal processor;
updating a parameter in a second echo cancellation filter with the signal processor with reference to a product of the identified difference and a complex conjugate of the plurality of values divided by a product of the maximum value and a magnitude of the plurality of identified values;
applying the updated parameter in the second echo cancellation filter to the first echo cancellation filter with the signal processor; and
applying the first echo cancellation filter with the updated parameter to the second acoustic signal to generate a second filtered acoustic signal with the signal processor, which reduces or eliminates an echo corresponding to the first acoustic signal; and
outputting the second filtered acoustic signal with the output device.

10. The method of claim 9, further comprising:
identifying a first difference between the estimated model and the second acoustic signal in a first frequency sub-band of both the first and second acoustic signals with the signal processor;
identifying a second difference between the estimated model and the second acoustic signal in a second frequency sub-band of both the first and second acoustic signals with the signal processor;
identifying a first maximum value corresponding to a maximum of (1) the first identified difference between the estimated model and the second acoustic signal and (2) a first predetermined minimum value with the signal processor;
identify a second maximum value corresponding to one of (1) the second identified difference between the estimated model and the second acoustic signal and (2) a second predetermined minimum value with the signal processor;
generating a first plurality of values corresponding to the first acoustic signal in the first frequency sub-band over the series of time intervals with the signal processor;
generating a second plurality of values corresponding to the first acoustic signal in the second frequency sub-band over the series of time intervals with the signal processor;
updating a first parameter in the second echo cancellation filter with the signal processor with reference to a product of the first identified difference and a complex conjugate of the first plurality of values divided by a product of the first maximum value and a magnitude of the first plurality of identified values;
updating a second parameter in the second echo cancellation filter with the signal processor with reference to a product of the second identified difference and a complex conjugate of the second plurality of values divided by a product of the second maximum value and a magnitude of the second plurality of identified values;
applying the first and second updated parameters from the second echo cancellation filter to the first echo cancellation filter with the signal processor; and
applying the first echo cancellation filter with the first updated parameter and the second updated parameter to the second acoustic signal with the signal processor to generate the second filtered acoustic signal.

11. The method of claim 10, wherein updating the first parameter in the second echo cancellation filter is made with further reference to a first predetermined constant value corresponding to the first frequency sub-band, and updating the second parameter in the second echo cancellation filter is made with further reference to a second predetermined constant value corresponding to the second frequency sub-band.

12. The method of claim 9, further comprising:
applying the second echo cancellation filter to the first acoustic signal to generate a third filtered acoustic signal with the signal processor;

identifying another difference between the third filtered acoustic signal and the second acoustic signal with the signal processor; and applying the updated parameter from the second echo cancellation filter to the first echo cancellation filter with the signal processor in response to the other difference between the third filtered acoustic signal and the second acoustic signal being smaller than the difference between the estimated model and the second acoustic signal.

13. The method of claim 9 further comprising:

identifying an average value of the updated parameter in the second echo cancellation filter and at least one other value of the parameter in the second echo cancellation at a previous time with the signal processor; and applying the average value of the updated parameter in the second echo cancellation filter to the first echo cancellation filter with the signal processor.

14. The method of claim 13, applying the average value of the updated parameter in the second echo cancellation filter to the first echo cancellation filter further comprising:

updating the parameter of the first echo cancellation filter with a sum of a previous value of the parameter in the first echo cancellation filter multiplied by a first weight factor and the average value of the updated parameter in the second echo cancellation filter multiplied by a second weight factor, a sum of the first weight factor and the second weight factor being one.

15. An echo cancellation system comprising:

an input device configured to receive a first acoustic signal from a first telephonic device and a second acoustic signal from a second telephonic device;

an output device configured to generate an output acoustic signal; and a signal processor operatively connected to the input device and the output device, the signal processor being configured to:

apply a first echo cancellation filter to the first acoustic signal to generate an estimated model of an echo generated by the first acoustic signal through the second telephonic device;

identify a difference between the estimated model and the second acoustic signal;

identify a maximum value corresponding to a maximum of (1) the identified difference between the estimated model and the second acoustic signal and (2) a predetermined minimum value;

generate a plurality of real values corresponding to the first acoustic signal over a series of time intervals;

update a parameter in a second echo cancellation filter with reference to a product of the identified difference and a the plurality of real values divided by a product of the maximum value and a magnitude of the plurality of real values;

apply the updated parameter in the second echo cancellation filter to the first echo cancellation filter;

apply the first echo cancellation filter with the updated parameter to the second acoustic signal to generate a second filtered acoustic signal that reduces or eliminates an echo corresponding to the first acoustic signal; and output the second filtered acoustic signal through the output device.

16. The system of claim 15, the signal processor being further configured to identify the magnitude of the plurality of real values with reference to a Euclidean norm of the plurality of real values.

17. The echo cancellation system of claim 15, the signal processor being further configured to:

apply the second echo cancellation filter to the first acoustic signal to generate a third filtered acoustic signal;

identify another difference between the third filtered acoustic signal and the second acoustic signal; and apply the updated parameter from the second echo cancellation filter to the first echo cancellation filter in response to the other difference between the third filtered acoustic signal and the second acoustic signal being smaller than the difference between the estimated model and the second acoustic signal.

18. The echo cancellation system of claim 15, wherein the signal processor is incorporated in a central office switch in a telephone network.

19. The echo cancellation system of claim 15, wherein the signal processor is incorporated in at least one of the first and second telephonic devices.

20. The echo cancellation system of claim 15, the signal processor being further configured to:

identify an average value of the updated parameter in the second echo cancellation filter and at least one other value of the parameter in the second echo cancellation at a previous time; and apply the average value of the updated parameter in the second echo cancellation filter to the first echo cancellation filter.

21. The echo cancellation system of claim 20, wherein the signal processor updates the parameter of the first echo cancellation filter with a sum of a previous value of the parameter in the first echo cancellation filter multiplied by a first weight factor and the average value of the updated parameter in the second echo cancellation filter multiplied by a second weight factor, a sum of the first weight factor and the second weight factor being one.

* * * * *